March 24, 1970  D. M. SOWARDS  3,502,596
CERAMIC STRUCTURES
Filed Nov. 16, 1965

INVENTOR
DONALD MAURICE SOWARDS

BY

AGENT

United States Patent Office 3,502,596
Patented Mar. 24, 1970

3,502,596
CERAMIC STRUCTURES
Donald Maurice Sowards, Claymont, Del., assignor to E. I. du Pont de Nemours and Company, Wilmington, Del., a corporation of Delaware
Filed Nov. 16, 1965, Ser. No. 508,073
Int. Cl. B01j 11/46, 1/20
U.S. Cl. 252—477    5 Claims

ABSTRACT OF THE DISCLOSURE

Honeycomb structures having the shape of solids the surfaces of which all form angles with the longitudinal axes of the honeycomb cells are useful as packing in chemical process vessel and as catalyst supports in chemical reactors.

---

This invention relates to ceramic honeycomb structures. The invention is particularly directed to ceramic honeycomb structures having the shape of solids the surfaces of which all form angles with the longitudinal axes of the honeycomb cells, and to the use of such structures as packing material in such vessels as distillation columns, mist eliminators, scrubbers, extractors, and regenerative type heat exchangers. The invention is also directed to such honeycomb structures which are catalyst-coated and their use in packed-bed reactors in place of conventional catalyst pellets.

The novel honeycomb structures of this invention in which all surfaces form angles with the cell axes, or, expressed differently, in which no surface is parallel to a cell wall, provide highly desirable packing material when randomly disposed in a vessel of the type commonly used to treat fluids in the chemical process and related industries. A bed composed of structures of the invention offers increased surface area with decreased pressure drop as compared with conventional packing materials. In addition, the honeycomb structures, when randomly disposed in a vessel, have a flow directing action which creates a high degree of turbulence in the vessel as the fluids being treated are deflected to and from the vessel walls. This turbulence is highly beneficial where the vessel is being used as a reaction chamber for an endothermic or exothermic reaction which requires external heating or cooling of the vessel, since as will be readily appreciated, the turbulence promotes heat transfer by convection. In addition, where the vessel is being used to carry out a gas-phase reaction, the arrangement provides line-of-sight paths through the spaces between the individual honeycomb structures, and also through the cells of the honeycomb, thus providing for improved heat transfer by radiation from the vessel walls.

The invention will be better understood by reference to the drawings which show two preferred shapes of the invention.

By "straight-cell" honeycomb section is meant one in which the longitudinal axes of the cells are perpendicular to two parallel planar faces of the section. By "slant-cell" honeycomb section is meant one in which the longitudinal axes of the cells form oblique angles with two parallel planar faces of the section.

Figure 1:
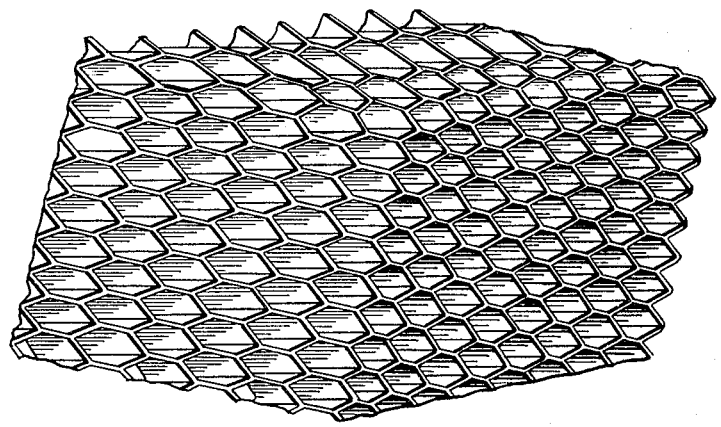
FIGURE 1 is a perspective view of a ceramic honeycomb structure in the shape of a right parallelepiped which has been cut from a slant-cell honeycomb section in such a way that all surfaces form angles with the longitudinal axes of the honeycomb cells.

Referring to FIGURE 1 it will be observed that regardless of how two such right parallelepipeds are placed in contact, the surface of one cannot block the flow of fluid through the honeycomb cells of the other, since all surfaces are penetrated by cells. Thus, there can be no stagnant areas in a randomly disposed bed of such structures, and pressure drop through such a bed is extremely low.

Figure 2:
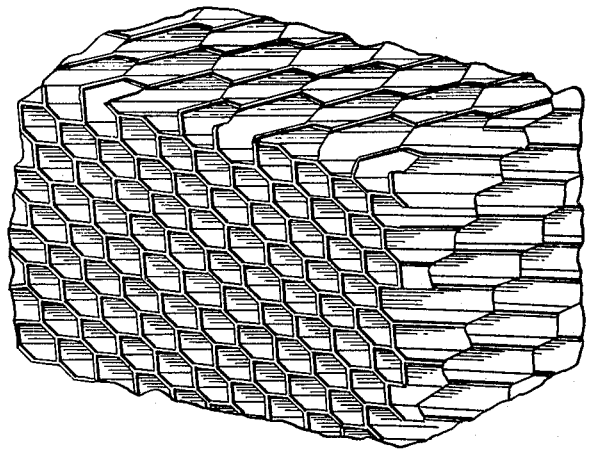
FIGURE 2 is a perspective view of a ceramic honeycomb structure in the shape of an oblique parallelepiped which has been cut from a straight-cell honeycomb section in such a way that all surfaces form angles with the longitudinal axes of the honeycomb cells.

The same of course is true of a bed of randomly disposed oblique parallelepipeds such as shown in FIGURE 2, or, in fact, for a bed of randomly disposed honeycomb structures of any shape so long as no surface of the structure is parallel to the cell walls.

Ordinarily, the novel ceramic honeycomb structures of the invention will have the shape of polyhedra, especially the simpler shapes such as triangular and rectangular prisms, and triangular and rectangular pyramids and truncated pyramids. The structures may also of course be in the shape of cylinders, cones, and truncated cones, the only requirement being that all surfaces of the shape be non-parallel with the longitudinal axes of the honeycomb cells.

Process vessels in which the structures of this invention are used can, as has been indicated, serve a variety of functions and thus can take a variety of forms. They will in general comprise a chamber containing a bed of randomly disposed ceramic structures of the invention and having at least two openings, one for entrance and one for exit of the fluid being treated. They may of course have other openings for introduction and/or withdrawal of other fluids, as for example in a liquid-liquid extractor, or in a reactor where two or more reactants are introduced separately. They may also of course include associated equipment such as agitators, baffles, tube-type heat exchangers, heating and cooling jackets and coils, and the like. The vessel may be a tank or it may be merely a section in a pipeline.

Methods for making ceramic honeycomb are well-known in the art and these will be mentioned briefly. No extended discussion of them appears to be necessary.

U.S. Patent 3,112,184, issued Nov. 26, 1963, to Hollenbach, describes a method for making ceramic honeycomb. A suspension containing a finely divided sinterable ceramic material and a binding agent is applied to each side of a flexible carrier. The coated carrier is then corrugated and formed into a honeycomb. According to the disclosure, the carrier is preferably an organic fibrous material which will decompose under the conditions of sintering, but inorganic carriers can also be used. Also according to the disclosure, the method can be used to produce honeycomb of virtually any ceramic material; examples include glasses such as boro-silicates, soda-lime-silicates, lead silicates, alumino-silicates, and alkaline earth silicates, and refractories such as sillimanite, magnesium silicate, magnesia, zircon, zirconia, petalite, spodumene, cordierite, corundum, and the glass ceramics.

British Patent 931,096, published July 10, 1963, discloses a similar method for making honeycomb wherein flexible sheets containing sinterable ceramic particles are formed and corrugated, two or more such corrugated sheets are place node to node, and the assembly is fired to sinter the ceramic particles and weld the sheets at points of contact. As a variation, alternate sheets of ceramic can be noncorrugated. The sheets are made by mixing the ceramic particles with plasticizing ingredients such as organic polymers and forming the mix into thin films. The film is preferably formed on a carrier such as a thin metal foil which provides a support during corrugation. After corrugation, the green film is removed from the support and is used in making a honeycomb structure. The structure is then fired to sinter the ceramic particles, resulting in a rigid honeycomb. This method according the disclosure is also applicable to a wide range of sinterable ceramic materials.

Belgian Patent 612,535, issued July 11, 1962, discloses a particularly suitable method for making the honeycomb structures of this invention. In this method aluminum foil is fabricated into a honeycomb structure of the desired shape and is fired under controlled conditions to oxidize the aluminum to alpha alumina. Prior to the firing step the aluminum foil is coated with an agent, identified in the patent as a fluxing agent, which serves to prevent inhibition of oxidation due to oxide scum formation on the surface of the aluminum. Examples of fluxing agents disclosed in the patent as being suitable include alkali metal and alkaline earth metal oxides and precursors of these oxides, i.e. compounds which yield the oxides on firing. A particularly suitable agent is sodium oxide which is applied as sodium silicate.

The honeycomb products resulting from this process are substantially pure alpha alumina. If desired, the chemical composition of the structures can be modified by including in the coating composition finely divided particles of filler refractory oxide. The filler refractories may, if desired, be one or more of those which will react with the alumina as it is formed. If a reactive filler such as magnesia and/or silica is used, the honeycomb structure will contain the corresponding reaction product such as spinel, cordierite or mullite. The products of this process are characterized by outstanding strength and thermal shock resistance.

As disclosed in the Belgian patent the honeycomb structures may be fabricated by corrugating sheets of aluminum foil coated with fluxing agent and placing the coated sheets together node to node. Where sodium silicate solution is used as the fluxing agent, the body will have sufficient green strength to maintain its shape until it is fired. Alternatively the honeycomb structure may first be fabricated from the aluminum foil using methods well known in the art and described in the patent literature. For general disclosure on the art of making honeycomb, reference is made to U.S. Patent Nos. 2,610,934, 2,674,295, and 2,734,843. For instruction on making slant-cell honeycomb, reference is made to U.S. Patent No. 3,006,798. Suitable prefabricated aluminum honeycomb structures for use in this process are available commercially and may be purchased from Hexcel Corporation or Bloomingdale Rubber Division of American Cyanamid, both of Havre de Grace, Md. Structures with nominal cell sizes ranging from 1/8" up to 3/4" and foil thickness of 0.7 mil to 7 mils are readily available. Other sizes with cells ranging from say 1/32" up to 2" or higher and with foil up to 1/4" in thickness can be made and used in the process disclosed in the Belgian patent. The preferred structures are prepared using foil of about 2 mils thick.

An improvement in the process for making honeycomb structures by the method of the Belgian patent is disclosed in copending U.S. application S.N. 367,856, filed May 15, 1964, now abandoned. In the process of this application the composition used to coat the aluminum honeycomb structure contains, in addition to the fluxing agent and filler refractory, if any, small amounts of a vanadium compound. The products of the Belgian patent are characterized by having a double-walled structure. The double wall results from the fact that the aluminum foil, as it melts, flows outwardly through the oxide formed on the outer surfaces of the foil and is oxidized at the outer surface of the oxide layer, thus leaving a large void in the final product corresponding approximately in thickness to the thickness of the original aluminum foil. The inclusion of the vanadium compound in the coating composition causes the formation of bridges of refractory material between these double walls, resulting in a product having even greater strength and thermal shock resistance than the products of the Belgian patent.

A further improvement in the process of the Belgian patent is disclosed in copending U.S. application S.N. 471,738, filed July 13, 1965. In the process of this application, the composition used to coat the aluminum honeycomb structure contains aluminum powder in addition to the fluxing agent and filler refractory, if any. The aluminum powder, of course, is oxidized to alumina during firing along with the aluminum in the original metal honeycomb. This method provides structures which are similar to those of the Belgian patent in that they are double-walled, but the walls can be made much thicker than the central void. Thus, the products are stronger than those of the Belgian patent.

A particularly preferred method for making mullite honeycomb is disclosed in copending application S.N. 449,629, filed Apr. 20, 1065, now abandoned. The method is similar to that disclosed in S.N. 471,738, but silicon carbide is added to the composition used to coat the aluminum metal honeycomb. Upon firing, the SiC reacts with the aluminum to provide mullite. Mullite structures are particularly preferred as catalyst carriers because of their low thermal expansion.

A further suitable method for making ceramic honeycomb is disclosed in copending application S.N. 336,983, filed Jan. 10, 1964 now U.S. Patent 3,338,995 to Sowards. In this method a "fugitive" material, e.g. paper, is coated with a composition including aluminum powder, a binder, a fluxing agent (of the type disclosed in the Belgian patent) and a liquid carrier. The "fugitive" material may be first coated then used to fabricate a honeycomb, or the honeycomb may be first fabricated from the fugitive material then coated. In either case, the coated structure is fired in oxygen to burn out the fugitive material and oxidize the aluminum. Filler refractories can of course be included in the coating compositions to provide ceramics including compounds and/or solid solutions of alumina with other oxides.

The novel honeycomb structures of this invention in which all faces are nonparallel with a cell wall can be made by first forming a template structure having the desired configuration then treating it in accordance with one of the methods discussed above. For example, straight- or slant-cell aluminum honeycomb can be purchased from one of the sources mentioned above and can be cut into parallelpipeds or other solid shapes in such a way that all faces form angles with the longitudinal axes of the cells. Methods for cutting aluminum honeycomb are well known. Suitable methods include cutting with a bread knife or similar sharp instrument, sawing with a rotary blade or band saw, and die-cutting. When sawing an aluminum honeycomb, best results, i.e., minimum damage to the cell walls, are obtained using a deverse-toothed saw. Damage can also be minimized by filling the cells with ice or a plastic material, but this is ordinarily not necessary. Die-cutting is ordinarily suitable only when cutting in a direction parallel to the cell axes. For further details on shaping honeycomb reference can be had to Bulletin TSB 117 of Hexcel Products, Inc., published July 1, 1962, and entitled, "Carving and Forming Honeycomb Materials."

After the aluminum honeycomb has been cut to the desired configuration it can be coated with a fluxing agent and fired in accordance with the procedures described in Belgian Patent 612,535 and applications S.N. 367,856, 449,629, 471,738 and 336,983, discussed above, to provide a ceramic honeycomb which corresponds closely in size and shape to the original aluminum honeycomb.

Alternatively of course the ceramic honeycomb can first be made in the usual manner in the form of a right parallelepiped in which the cell axes are perpendicular to two faces of the structure. In such a structure, of course, four faces are parallel in the longitudinal axes of the cells, as shown, for example, in FIGURE 2 of the drawings in the Hollenbach U.S. Patent 3,112,184. The ceramic honeycombs can then be cut using a diamond saw in such a way that all faces form angles with the lonigtudinal axes of the cells.

Honeycomb structures of this invention can vary widely in overall size and in honeycomb cell size and wall thickness. The methods mentioned and described briefly above can be used to provide honeycombs of virtually any dimensions. The overall size of the honeycomb structures will vary depending upon the application—i.e., the surface area desired, the permissible pressure drop, the cross-section of the vessel, and the like. Cell size and wall thickness will depend upon similar considerations and also upon the ruggedness required of the structures. In general, for use as packing material the structures will range in overall size between about ⅛ and 250 cubic inches, preferably between about 1 and about 10 cubic inches. Preferably, the structures are rather compact in shape such that the major dimension is not more than about 4 and preferably not more than about 2 times greater than the least dimension. Cell size (average dimension normal to longitudinal cell axis) can range from as low as about 1/32" or below up to about 2" or higher. In applications where high surface area is more important than low pressure drop, the 1/32" cell size is preferred. The 2" cell size of course provides extremely low pressure drop, but at the expense of surface area. For most applications wherein both surface area and pressure drop are significant, cell sizes between 1/16" and ¾" are preferred.

Cell walls in the honeycomb structures of the invention can range from 1 mil up to 200 mils or more, but for optimum combination of strength, pressure drop, and surface area, wall thicknesses in the range of 5 to 100 mils are preferred. Wall thickness will of course vary with cell size, and a convenient way of expressing the relationship is in terms of percent open area transverse to the longitudinal axes of the honeycomb cells. Thus, the open area should range between about 40 and about 95 percent, and preferably between 70 and 90 percent.

As indicated above, the structures of the invention can be coated with catalysts and used in a manner similar to conventional catalyst pellets with highly beneficial results, especially in gas phase reactions such as methane reforming or partial oxidation which require external heating or cooling of the reaction vessel. The catalytic materials can be any of the inorganic materials commonly used as catalysts. Thus there can be used the oxides, cerates, chromates, chromites, manganates, manganites, and vanadates of such metals as iron, cobalt, nickel, palladium, platinum, ruthenium, rhodium, manganese, chromium, copper, molybdenum, tungsten, and the rate earth metals. The precious metals such as ruthenium, rhodium, platinum, and palladium can of course also be used in elemental form.

Catalysts can be deposited on the honeycomb structures according to the conventional techniques for making supported catalysts. Since these methods are already familiar to those skilled in the art, no extended discussion of them appears to be necessary. In general, they involve contacting the support with a solution containing a soluble salt of the catalytic metal, then adding a precipitant such as a soluble chromate, carbonate, oxalate, hydroxide, or the like, to cause a decomposable compound of the metal to precipitate onto the support. The coated support is then dried and calcined to convert the decomposable salt to the catalytically active oxide or chromite or the like. Many variations of this basic procedure are of course known and all such variations are intended to be included within the scope of this invention. For example mixtures of soluble salts of two or more metals can be treated in solution with a precipitant to provide mixed catalysts. Soluble salts of precious metals can of course be treated with a reducing agent such as formaldehyde, ethanol, or hydrogen, to provide the metal in elemental or sub-oxide form. Further details relating to the preparation of catalyst coated ceramic honeycomb can be obtained by reference to copending application Ser. No. 293,618, filed July 9, 1963 now U.S. Patent 3,397,154 to Talsma.

The invention will be further described by the following illustrative examples:

EXAMPLE 1

A 12" x 12" x 1½" thick piece of aluminum honeycomb of 0.002" thick 5052 foil made into 3/16" diameter cell with the cell axes in the 1½" direction was obtained from Hexcel Products, Inc., Havre de Grace, Md. Parallelepipeds were cut from this aluminum honeycomb as follows: the piece was cut into strips by band sawing at 1¾" intervals perpendicular to the foil direction and at a 45° angle to the longitudinal axes of the cells. The first and last strips were discarded. The remaining four strips were cut into oblique parallelepipeds by band sawing at 2" intervals at 90° to the first cut and 45° to the longitudinal axes of the cells.

The resulting parallelepipeds were etched in 1% aqueous sodium hydroxide for one minute at 30° C. The etched pieces were then coated by immersing into a slurry consisting of:

1.0 part by weight of a 1% aqueous solution of carboxymethylcellulose, Type 7HS, Hercules Powder Company;
1.0 part by weight of 41° Bé. solution of sodium silicate, $Na_2O:SiO_2$ of 1:3.25;
0.7 part by weight of 100 mesh calcined alumina, A–5, Aluminum Company of America;
1.0 part by weight of −325 mesh aluminum powder, 123, Aluminum Company of America.

The pieces were removed from the slurry, drained, and dried for several hours in air at room temperature, then placed in a circulating air oven at 90° C. overnight. The pieces were subjected to the above coating, draining, and drying operations for a total of two cycles.

The slurry coated pieces were then placed in a gas-fired kiln and fired in air according to the following schedule:

| Time, hours: | Temperature, ° C. |
| --- | --- |
| 17 | 200 to 600 |
| 11 | 600 to 800 |
| 14 | 800 to 1200 |
| 22 | 1200 to 1580 |
| 8 | at 1580 |

The kiln was cooled to room temperature in 48 hours and the product removed.

The fired product consisted of parallelpipeds of the dimensions of the unfired pieces, pink in color, and consisted of mainly α-alumina, a small quantity of the magnesium aluminate spinel, traces of ruby, mullite, and an unidentified amorphous phase.

EXAMPLE 2

A piece of slant cell aluminum honeycomb 12" x 12" x 1½" thick made of 0.002" thick 5052 alloy foil into 3/16" diameter cells was obtained from American Cyanamid Company, Bloomingdale Division, Havre de Grace, Md. The longitudinal axes of the cells were at 45° to the 12" x 12" faces of the honeycomb.

The piece of aluminum honeycomb was etched in 1% aqueous sodium hydroxide for 2–3 minutes at about 30° C. The etched aluminum honeycomb was then coated by immersing in a slurry of:

1.0 part by weight of a 1% aqueous solution of carboxymethylcellulose, Type 7HS, Hercules Powder Company;
1.0 part by weight of a 41° Bé solution of sodium silicate, $Na_2O:SiO_2$ of 1:3.25;
0.25 part by weight of water;
0.50 part by weight of 325 mesh aluminum powder, 123, Aluminum Company of America;
0.70 part by weight of 100 mesh calcined alumina, A–5, Aluminum Company of America;

1.5 parts by weight of 325 mesh silicon carbide powder, F grit, Carborundum Company;

0.5 part by weight of 100 mesh bonding clay, Cedar Heights Clay Company, Oak Hill, Ohio.

After removing from the slurry, the piece was drained and air dried. The piece was then set by pressing at 5 p.s.i. between platens heated to 150° C. for about three minutes. The coating, drying, and heat setting operations were repeated once.

The coated aluminum honeycomb was then fired in a gas-fired kiln according to the following schedule:

| Time, hours: | Temperature, °C. |
|---|---|
| 18 | 200 to 600 |
| 4 | 600 to 800 |
| 21 | 800 to 1000 |
| 13 | 1000 to 1200 |
| 8 | 1200 to 1400 |
| 17 | 1400 to 1560 |
| 4 | at 1560 |

After cooling to room temperature in 48 hours, the fired product was removed from the kiln. The fired product was translucent grayish-white in color and consisted of mainly mullite, a small quantity of $\alpha$-alumina and an unidentified amorphous phase.

The fired product was cut into 1½" x 1½" x 1½" cubes by diamond sawing. The plane of the cuts was perpendicular to the 12" x 12" faces of the ceramic honeycomb product. One series of parallel cuts were made at 45° to the foil direction of the original aluminum honeycomb on 1½" spacings and a second series of parallel cuts made at 90° to the first cuts also on 1½" spacings.

EXAMPLE 3

A 6" x 6" x 2" block of Alsimag 769 "Thermacomb" corrugated ceramic was obtained from American Lava Corporation, Chattanooga, Tenn., a subsidiary of Minnesota Mining and Manufacturing Co. The product was made up of alternate corrugated and flat sheets of zircon with the flat sheets spaced 0.1" apart. Corrugations were 4½ per inch. The longitudinal axes of the cells formed by the corrugations were perpendicular to the 6" x 6" faces. The piece was cut into two 6" x 6" x 1" pieces by sawing along a plane midway between and parallel to the 6" x 6" faces.

The 6" x 6" x 1" pieces were cut into parallelepipeds in the following manner:

A series of parallel cuts were made by sawing on 1¼" spacing at 45° to the longitudinal axes of the cells and perpendicular to the flat sheets of ceramic. The resulting strips were then cut into the parallelepipeds by sawing at 90° to the first cut on 1" spacings and at 45° to the longitudinal axes of the cells. The resulting parallelepipeds has 2 parallel rectangular faces 1½" x 1" lying in planes 1" apart. The longitudinal axes of the cells were perpendicular to these faces.

EXAMPLE 4

A 6" x 6" x 3" piece of "Cercor" corrugated ceramic made up of alternate flat and corrugated ceramic sheets was obtained from Corning Glass Works, Corning, N.Y. The longitudinal axes of the cells formed by the structure were perpendicular to the 6" x 6" faces. The flat sheets were more or less uniformly spaced at 18 per inch. The corrugations were approximately 9 per inch.

The 6" x 6" x 3" blocks were cut by sawing along a plane midway between and parallel to the 6" x 6" faces into two 6" x 6" x 1½" blocks. The 6" x 6" x 1½" blocks were cut into parallelepipeds in the following manner:

The blocks were first cut into strips by sawing along parallel planes spaced about 1¾" apart. These planes were at 45° to both the flat ceramic sheets and the longitudinal axes of the cells. The strips were then cut into the final parallelepipeds by sawing along parallel planes spaced about 2¼" apart. This second series of planes was simultaneously at 45° to both the planes of the first series of cuts and to the longitudinal axes of the cells. The resulting parallelepipeds had two parallel faces perpendicular to the longitudinal axes of the cells in the shape of 45° parallelograms with pairs of intersecting edges of about 2.6" and 2.0" long, respectively. These faces were contained in parallel planes 1½" apart.

The invention claimed is:

1. A ceramic honeycomb structure having the longitudinal axes of all its cells parallel to each other characterized in that the structure has the shape of a solid the surfaces of which all form angles with the longitudinal axes of the honeycomb cells, a cell size ranging from 1/32 inch to 2 inches, an overall volume in the range of 1/8 to 250 cubic inches, and a percent open area transverse to the longitudinal axes of the cells in the range of 40 to 95%.

2. A structure as defined in claim 1 having deposited thereon a catalytic material.

3. A ceramic honeycomb structure as defined in claim 1 having the form of a parallelepiped.

4. A structure as defined in claim 3 having an overall volume in the range of 1 to 10 cubic inches, a cell size ranging from 1/16" to 3/4", and a percent open area transverse to the longitudinal axes of the cells in the range of 70 to 90%.

5. A structure as defined in claim 4 having deposited thereon a catalytic material.

References Cited

UNITED STATES PATENTS

| 2,634,232 | 4/1953 | Houdry | 23—288 X |
| 2,728,479 | 12/1955 | Wheeler. | |
| 2,977,265 | 3/1961 | Forsberg et al. | |
| 3,006,798 | 10/1961 | Holland | 156—197 |
| 3,037,592 | 6/1962 | Shipley et al. | |
| 3,109,715 | 11/1963 | Johnson et al. | 23—288 |
| 3,198,847 | 8/1965 | Lanning | 23—288 X |
| 3,205,109 | 9/1965 | Schudel | 156—197 |
| 3,257,260 | 6/1966 | Morgan | 161—69 |
| 3,379,570 | 4/1968 | Berger et al. | 252—477 X |
| 3,423,185 | 1/1969 | Ballard et al. | 23—288 |

JOSEPH SCOVRONEK, Primary Examiner

U.S. Cl. X.R.

23—283, 288; 55—90, 183, 233, 259, 521; 106—39; 161—68; 210—150; 261—94; 264—44, 59